(12) United States Patent
Nacson

(10) Patent No.: US 6,903,725 B2
(45) Date of Patent: Jun. 7, 2005

(54) SELF-POWERED CORDLESS MOUSE

(76) Inventor: Sabatino Nacson, 93 Crown Heights Crescent, Thornhill, Ontario (CA), L4J 5T1

( * ) Notice: Subject to any disclaimer, the term of this patent is extended or adjusted under 35 U.S.C. 154(b) by 145 days.

(21) Appl. No.: 10/061,284

(22) Filed: Feb. 4, 2002

(65) Prior Publication Data

US 2002/0118173 A1 Aug. 29, 2002

Related U.S. Application Data

(60) Provisional application No. 60/270,612, filed on Feb. 23, 2001.

(51) Int. Cl.[7] .................................................. G09G 5/08
(52) U.S. Cl. .................... 345/163; 345/164; 345/156
(58) Field of Search ......................... 345/156, 163–167, 345/161, 168

(56) References Cited

U.S. PATENT DOCUMENTS 5,838,138 A   11/1998   Henty .......................... 320/107

FOREIGN PATENT DOCUMENTS

| GB | 2314470 | 12/1997 | H02J/7/00 |
| JP | 406059810 | * 3/1994 | |
| JP | 406332615 | * 12/1994 | |
| JP | 407225649 | * 8/1995 | |
| JP | 410049297 | * 2/1998 | |
| JP | 10-283079 | 10/1998 | G06F/1/26 |
| JP | 411045152 | * 2/1999 | |
| JP | 411219257 | * 8/1999 | |

* cited by examiner

Primary Examiner—Ricardo Osorio
(74) Attorney, Agent, or Firm—Katten Muchin Zavis Rosenman

(57) ABSTRACT

A self-powered computer-pointing device includes a housing and a roller ball accommodated within the housing. At least a portion of the roller ball is exposed through an opening in the housing to allow the roller ball to contact a surface on which the computer-pointing device rests. Movement of the computer-pointing device across the surface imparts rotation of the roller ball. A sensing mechanism senses movement of the roller ball and generates x-y movement signals corresponding to movement of the computer-pointing device across the surface. The sensing mechanism conveys the x-y movement signals to a host computer. A power generating mechanism is coupled to the roller ball and converts rotational movement of the roller ball into electrical energy that is used as power by the computer-pointing device.

15 Claims, 5 Drawing Sheets

SELF-POWERED CORDLESS MOUSE

RELATED APPLICATIONS

The present application is related to U.S. Provisional Patent Application Ser. No. 60/270,612 filed on Feb. 23, 2001 for an invention entitled "Self-Powered Cordless Mouse".

FIELD OF THE INVENTION

The present invention relates in general to auxiliary input devices for computers and more specifically, to a self-powered computer-pointing device.

BACKGROUND OF THE INVENTION

Computer-pointing devices are often used in connection with computers to facilitate entry of user input and to enhance the functionality of the computers. One common type of computer-pointing device is the cord-based mouse. This type of mouse is connected to the computer by a cord and is moved over a pad to effect movement of the cursor displayed on the monitor of the computer. When the cursor is positioned at the desired location, actions can be invoked by clicking on one of the mouse buttons. Using the mouse in this manner allows a computer user to navigate through graphical user interfaces displayed on the computer monitor quickly and easily thereby facilitating user access to various files and programs.

Although this type of mouse is satisfactory for the most part, problems do exist. Since the mouse is physically connected to the computer by the cord, the cord restricts the movement capabilities of the mouse. If the cord is taut, the user is required to lift the mouse off the pad to provide slack in the cord before placing the mouse back down on the pad. Also, the user is required to navigate the mouse in close proximity to the computer.

More recently, developments in the field of mouse technology have led to cordless mice. As will be appreciated, the cordless mouse overcomes the problems associated with cord-based mice discussed above. However, the cordless mouse suffers from its own disadvantage. Since the cordless mouse is not physically connected to the computer, the mouse is not able to draw power from the computer power supply. Therefore, the cordless mouse requires batteries to provide the power necessary to operate the mouse. Batteries of course require replacing when they run low and replacing batteries is inconvenient. Also, batteries can drain at unexpected and inappropriate times creating user annoyance especially if the batteries drain while the user is in the middle of an important project.

To deal with this power supply problem, a number of self-powered auxiliary input devices have been considered. For example, U.S. Pat. No. 5,838,138 to Henty, entitled "Electronic Device Which is Powered by Actuation of Manual Inputs", discloses a system having a mechanical power convertor to convert mechanical energy applied to the keys of a keyboard into electrical energy that is used to charge a rechargeable battery. The power convertor includes a thin high strength magnet that is fixed to the central portion of each key. A coil surrounds each magnet. Each coil is mounted on a mandrel that is attached to the keyboard. Current is induced in the coil when the key is actuated.

U.K. Patent Application No. 2,314,470 to Tien, entitled "Battery Charging Arrangement with Inductively Coupled Charging Device and Rechargeable Device", discloses a mouse accommodating a rechargeable battery that is re-charged by a magnetic field generated by primary and secondary induction coils of a charging device. The rechargeable battery is connected to the secondary induction coil that is displaced from the primary induction coil. The battery is charged when the induction coils are located adjacent one another such that a current in the primary induction coil induces a current in the secondary induction coil.

Japanese Patent Application No. 10283079 issued to Sony Corporation, discloses a mouse with a detection roller that moves in two axial directions corresponding to the rotation of a roller ball. A roller rotation detector senses the amount of movement of the detection roller in the two axial directions. A transmission circuit communicates with the roller rotation detector and converts the sensed movement of the detection roller into electromagnetic signals. Electric power is produced by a generator in response to the electromagnetic signals. The produced electric power is stored by a secondary battery and supplied to the transmission circuit. Although this reference discloses a mouse including a mechanism to generate power, problems exist in that since the detection roller moves in two axial directions, the mouse is subject to mechanical failure.

As will be appreciated, improvements to cordless computer-pointing devices are desired. It is therefore an object of the present invention to provide a novel self-powered computer-pointing device.

SUMMARY OF THE INVENTION

The present invention provides a self-powered computer-pointing device that converts movements of the computer-pointing device across a contact surface into electrical power that is used either to power directly the computer-pointing device or charge an internal rechargeable power supply.

Accordingly, in one aspect of the present invention there is provided a self-powered computer-pointing device comprising:

a housing;

a roller ball accommodated within said housing, at least a portion of said roller ball being exposed through an opening in said housing to allow said roller ball to contact a surface on which said computer-pointing device rests, movement of said computer-pointing device across said surface imparting rotation of said roller ball;

a sensing mechanism sensing movement of said roller ball and generating x-y movement signals corresponding to movement of said computer-pointing device across said surface, said sensing mechanism conveying said x-y movement signals to a host computer; and a power generating mechanism coupled to said roller ball, said power generating mechanism converting rotational movement of said roller ball into electrical energy that is used as power by said computer-pointing device.

In one embodiment, the power generating mechanism is directly coupled to the roller ball and includes a roller assembly rotatably coupled to the roller ball and a power generator coupled to the roller assembly. Preferably, the roller assembly is spring-loaded. It is also preferred that the roller assembly includes a roller rotatably coupled to the roller ball and that the power generator has a shaft coupled to the roller. Rotation of the roller ball imparts rotation of the roller and in turn the shaft. The power generator outputs electrical pulses in response to rotation of the shaft.

Preferably, the electrical pulses are received by internal circuitry within the housing. The internal circuitry accumulates the electrical pulses to establish an operating voltage that is used to power the internal circuitry and the sensing mechanism. The internal circuitry may include a capacitor bank to accumulate the electrical pulses and establish the operating voltage. Alternatively, the computer-pointing device may further include a rechargeable power supply within the housing to power the internal circuitry and the sensing mechanism. In this case, the operating voltage is applied to the rechargeable power supply thereby to recharge the same.

In another embodiment, the power generating mechanism is coupled to the roller ball through the sensing mechanism. In this case, the power generating mechanism includes transmissions coupled to the rollers of the sensing mechanism that sense either lateral or axial movement of the computer-pointing device. Power generators are coupled to the transmissions and output electrical pulses in response to rotation of the sensing mechanism rollers.

In an alternative embodiment, the power generating mechanism includes roller contacts coupled to the roller ball and a power generator coupled to the roller contacts. Rotation of the roller ball is sensed by the roller contacts. The power generator generates electrical pulses in response to sensed rotation of the roller ball by the roller contacts.

The computer-pointing device may be cordless or cord-based. In the case of a cord-based computer-pointing device, the electrical energy generated by the power generating mechanism is used to provide power to enable enhanced features of the computer-pointing device.

The present invention provides advantages in that the computer-pointing device has an extended operating time as compared to prior art cordless mice due to the fact that movements of the computer-pointing device across a surface are converted to electrical power. This enables the computer-pointing device to be continually powered through motion of the computer-pointing device. The present invention also provides advantages in that since the power generating mechanism is of a simple design, it can to be incorporated into computer-pointing devices inexpensively and is less prone to mechanical failure than prior art self-powered cordless mice.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
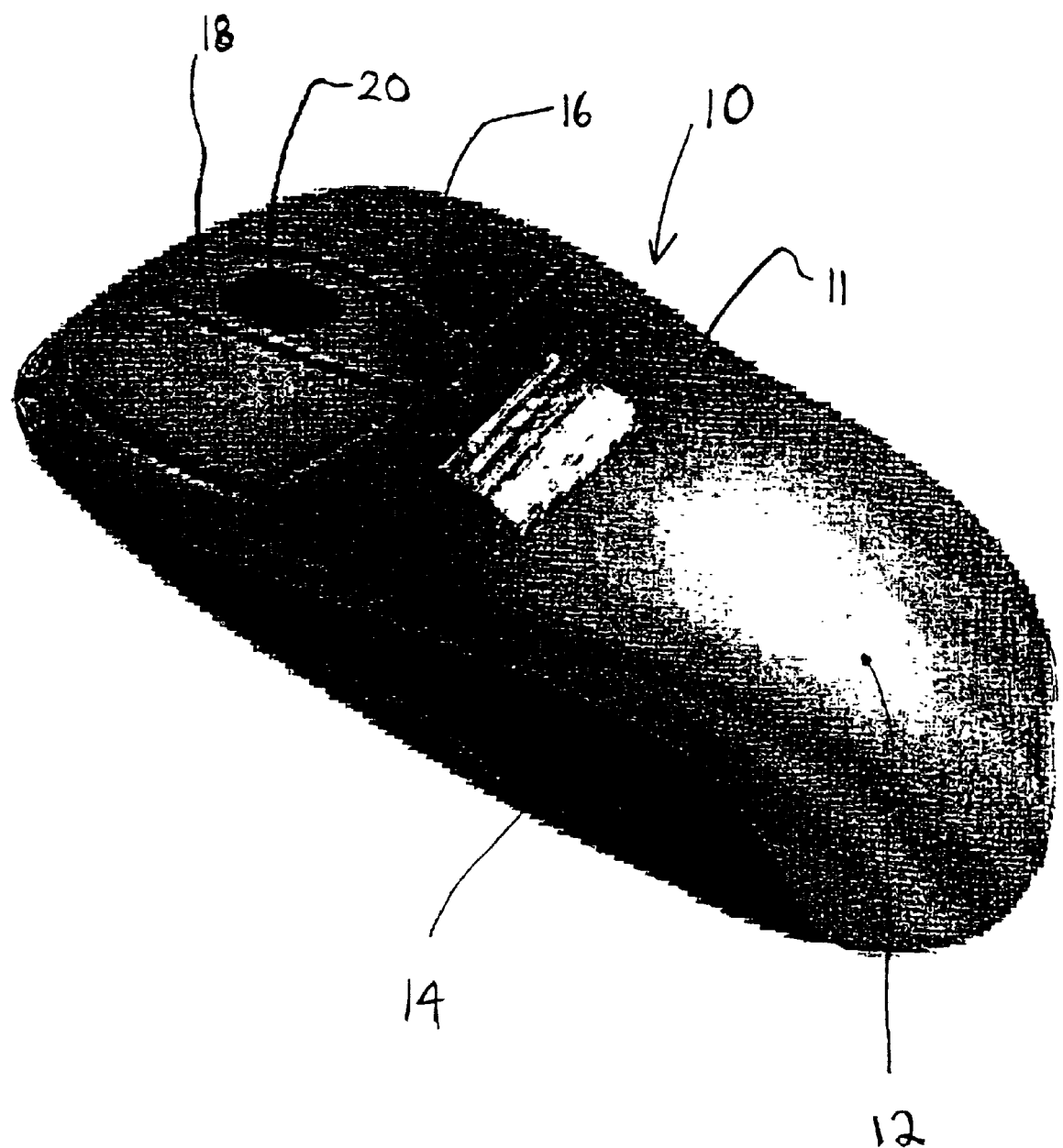
FIG. 1 is a perspective view of a cordless computer-pointing device in accordance with the present invention.

Turning now to FIG. 1, a computer-pointing device in the form of a cordless mouse is shown and is generally identified by reference numeral 10. The cordless mouse 10 includes a generally ovate housing 11 having a smooth, contoured upper surface 12 and a pair of side walls 14. Three buttons 16, 18 and 20 are provided on the upper surface 12 near its front end. The housing 11 is ergonomically shaped so that the hand of a user may fit comfortably around the mouse 10 with the tips of the user's fingers resting on the three buttons 16, 18 and 20. Although a three button mouse is shown, the mouse 10 may include any number of buttons.

Figure 2:
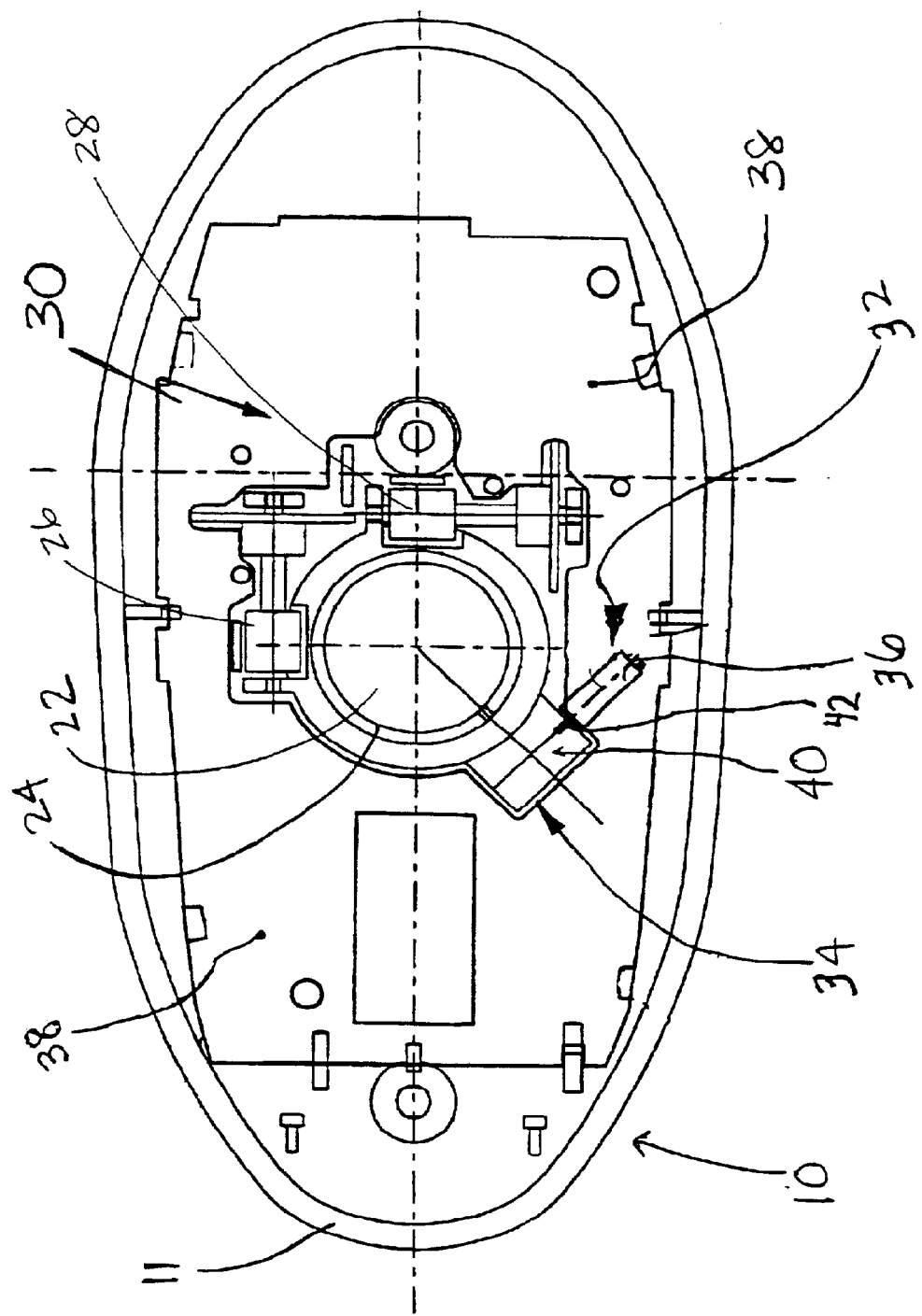
FIG. 2 is a plan view, taken from below, of the interior of the computer-pointing device of FIG. 1 showing a power generating mechanism.

FIG. 2 shows the interior of the housing 11. As can be seen, a roller ball casing 24 is centrally disposed within the housing 11. The roller ball casing 24 accommodates a roller ball 22. Similar to a conventional mouse, a portion of the roller ball 22 is exposed through an opening in the base (not shown) of the housing 11 so that the roller ball 22 rotates when the mouse 10 is moved across a contact surface, such as a mouse pad.

Two rollers 26 and 28 are supported within the housing 11 and are positioned so that they are in rotational contact with the roller ball 22. Roller 26 is positioned to sense movement of the roller ball 22 when the mouse 10 is moved across the contact surface laterally. Roller 28 is positioned to sense movement of the roller ball 22 when the mouse 10 is moved across the contact surface axially. Thus, the lateral component of mouse movements imparts rotation of the roller 26 via the roller ball 22 while the axial component of mouse movements imparts rotation of roller 28 via the roller ball 22. Circuitry 30 communicates with the two rollers 26 and 28 and converts movement of the rollers 26 and 28 into x-y movement signals. Circuitry 30 also communicates with the buttons 16 to 20 and generates corresponding signals when of one or more of the buttons 16, 18 or 20 is depressed. The x-y movement signals and button depression signals are conveyed by the circuitry 30 to a host computer (not shown) via a wireless communications link. The functionality of the buttons 16 to 20, rollers 26 and 28 and circuitry 30 is conventional. Accordingly, no further details will be provided herein.

A power generating mechanism 32 to convert rotation of the roller ball 22 into electrical power is also disposed within the housing 11. The power generating mechanism 32 comprises a spring-loaded roller assembly 34, an AC or DC power generator 36, and internal circuitry (not shown). The spring-loaded roller assembly 34 includes a roller 40 that is rotatably coupled to the roller ball 22. In this manner, rotation of the roller ball 22 imparts rotation of the roller 40. The power generator 36 includes a shaft 42 rotatably coupled to the roller 40 so that shaft 42 rotates when the roller 40 rotates. The internal circuitry is mounted on a circuit board 38 secured to the interior upper surface of the housing 11. The internal circuitry is electrically connected to the circuitry 30 and provides the necessary operating power to the circuitry 30. The operation of the mouse 10 and in particular, the power generating mechanism 32 will now be described.

When the cordless mouse 10 is moved across the contact surface to impart rotation of the roller ball 22 and hence, rotation of one or both of the rollers 26 and 28, the circuitry 30 generates x-y movement signals. The x-y movement signals are conveyed to the host computer via the wireless communications link. In addition, rotation of the roller ball 22 imparts rotation of the roller 40. Rotation of the roller 40 causes the shaft 42 of the power generator 36 to rotate. In response to rotation of the shaft 42, the power generator 36 outputs electrical pulses. The electrical pulses output by the power generator 36 are received and accumulated by the internal circuitry to establish an operating voltage. Several revolutions of the roller ball 22 result in an accumulated voltage having a voltage peak of a few seconds duration. The accumulated voltage is rectified by the internal circuitry and is used to power the internal circuitry and the circuitry 30. The internal circuitry preferably includes a capacitor bank, for storing any unused power.

As will be appreciated, the power generating mechanism 32 is of a simple design yet allows movements of the mouse to be converted into electrical energy that is used to power the mouse 10.

Figure 3:
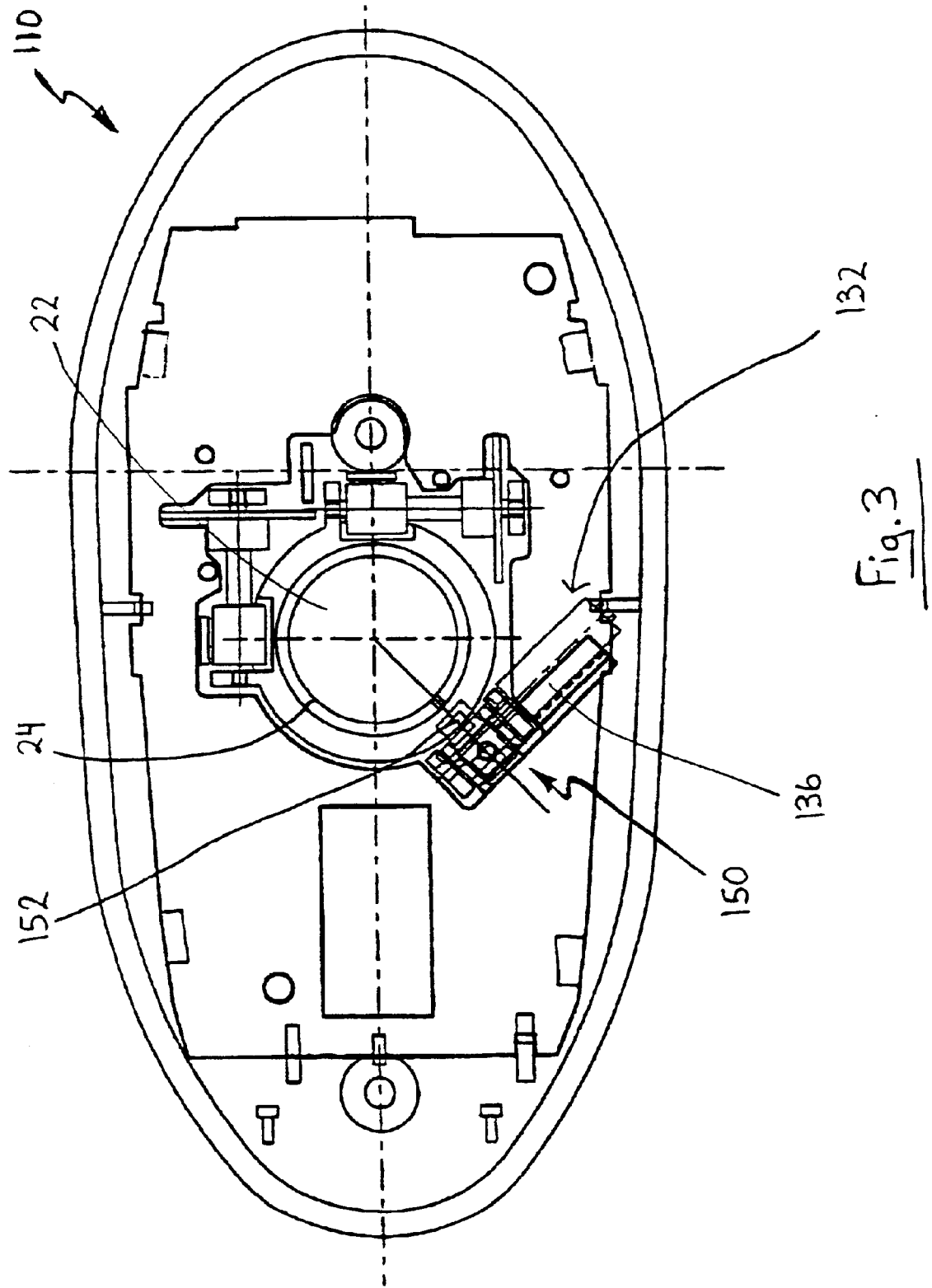
FIG. 3 is a plan view, taken from below, of the interior of the computer-pointing device of FIG. 1 showing an alternative embodiment of a power generating mechanism.

Turning now to FIG. 3, a computer-pointing device 110 incorporating another embodiment of a power generating mechanism 132 is shown. In this embodiment, the power generating mechanism 132 includes a housing 150 integral with the roller ball casing 24. Roller contacts 152 are disposed within the housing 150 and are coupled to the roller ball 22. A power generator 136 is coupled to the roller contacts 152. In this manner, rotation of the roller ball 22 is sensed by the roller contacts 152. The power generator 136, which is coupled to the roller contacts 152 converts the sensed roller ball rotation into electrical pulses. Similar to the first embodiment, the electrical pulses are accumulated by the internal circuitry in the manner described previously.

Figure 4:
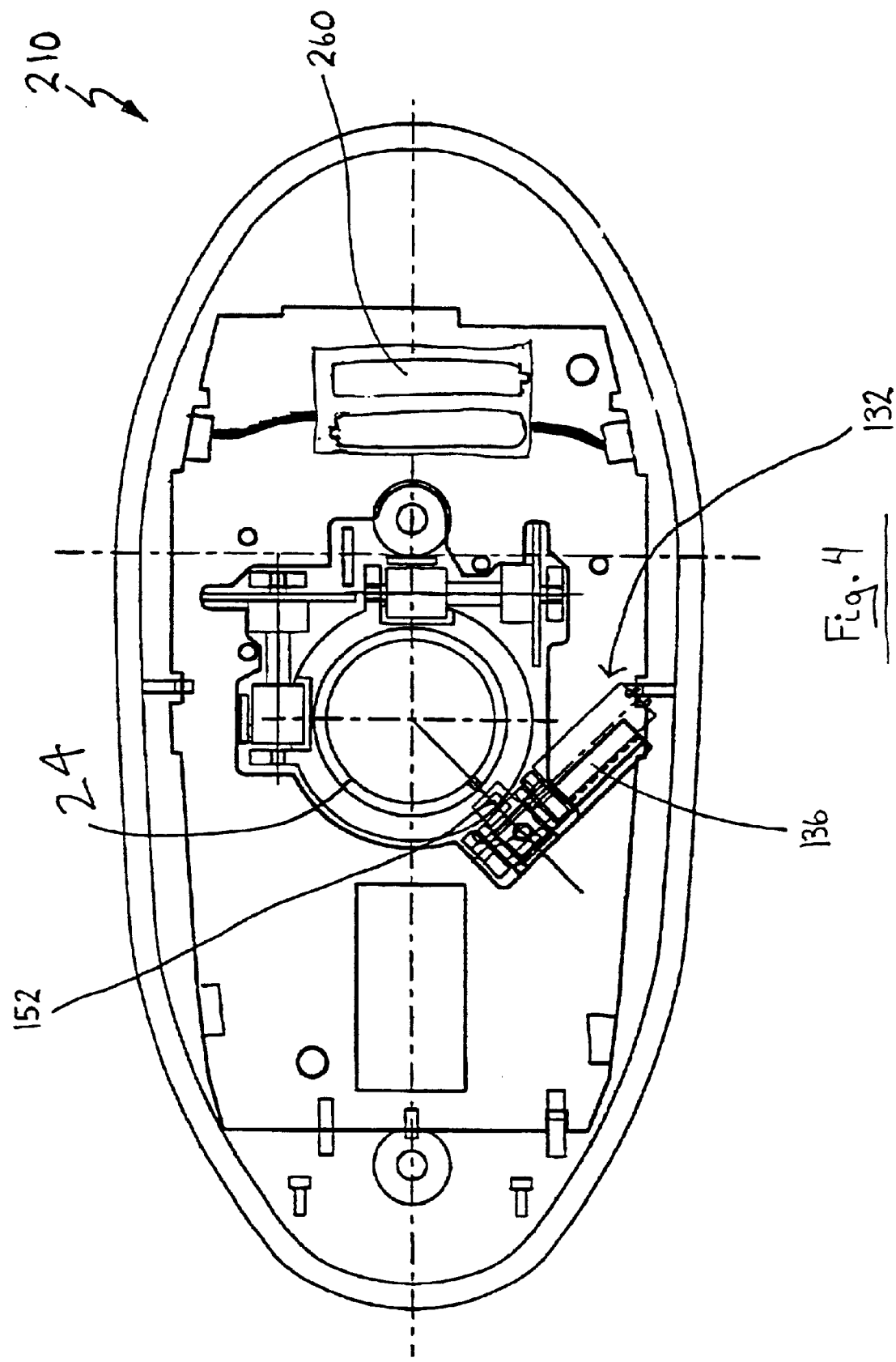
FIG. 4 is a plan view, taken from below, of the interior of an alternative embodiment of a computer-pointing device in accordance with the present invention including the power generating mechanism of FIG. 3.

Turning now to FIG. 4, another embodiment of a computer-pointing device 210 in accordance with the present invention is shown. The computer-pointing device 210 includes a power generating mechanism 132 that is the same as the power generating mechanism shown in FIG. 3. However, in this embodiment, the internal circuitry supplies the accumulated voltage to rechargeable batteries 260 accommodated within the housing 11. In this case, the rechargeable batteries 260 power the internal circuitry and the circuitry 30. As will be appreciated, the rechargeable batteries 260 are continually recharged through movements of the computer-pointing device 210 thereby reducing the frequency by which the rechargeable batteries need to be replaced and/or recharged.

Figure 5:
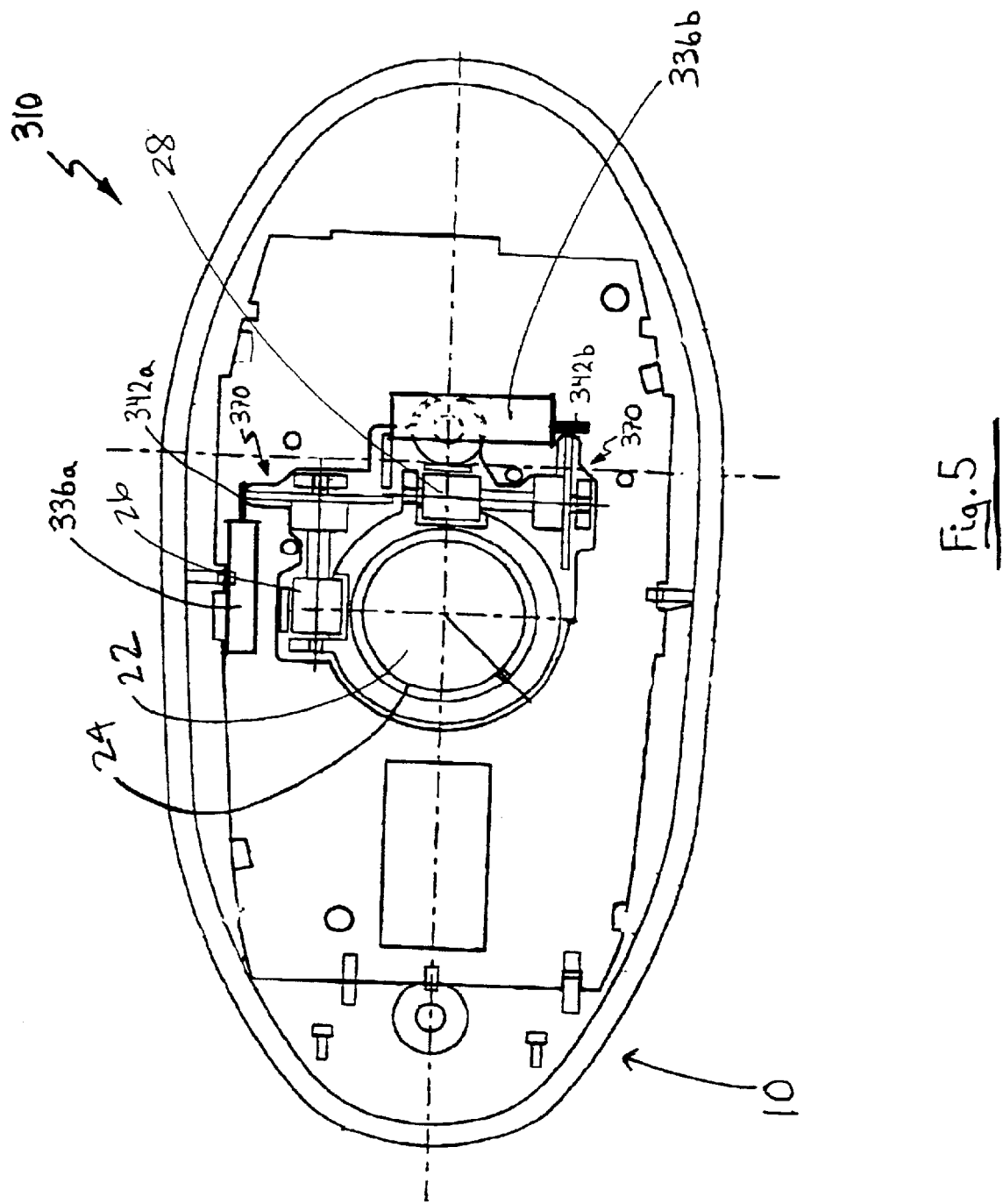
FIG. 5 is a plan view, taken from below, of the interior of the computer-pointing device of FIG. 1 showing yet another embodiment of a power generating mechanism.

Turning now to FIG. 5, a computer-pointing device 310 incorporating yet another embodiment of a power generating mechanism 332 is shown. In this embodiment, the power generating mechanism 332 includes a pair of power generators 336a and 336b. Each power generator is coupled to a respective one of the rollers 26 and 28 by way of a transmission 370. When the roller ball 22 imparts rotation of the rollers 26 and 28, the rotation of the rollers imparts rotation of the power generator shafts 342a and 342b via the transmissions 370. Rotation of the shafts 342a and 342b causes the power generators 336a and 336b to output electrical pulses that are accumulated by the internal circuitry in the manner described previously. As will be appreciated, this power generating mechanism design obviates the need for the spring-loaded roller assembly 34 by using the existing rollers 26 and 28 to impart rotation of the power generator shafts 342a and 342b.

Although the internal circuitry is described as being disposed on a circuit board separate from the circuitry 30, those of skill in the art will appreciate that the internal circuitry may be incorporated into the circuitry 30.

The present invention provides a simple and inexpensive power generating mechanism for use in a computer-pointing device that allows movement of the computer-pointing device to be converted into electrical energy that can then be used to power the computer-pointing device. Although the power generating mechanisms are described as being used in a cordless computer-pointing device, those of skill in the art will appreciate that the power generating mechanism can also be used in a cord-based computer-pointing device that requires additional power to enable enhanced functionality. Examples of such cord-based computer-pointing devices include Microsoft's trackball optical mouse and fingerprint scanner mouse.

Although preferred embodiments of the present invention have been described herein, those of skill in the art will appreciate that variations and modifications may be made without departing from the spirit and scope thereof as defined by the appended claims.

What is claimed is:

1. A self-powered computer-pointing device comprising:
   a housing;
   a roller ball accommodated within said housing, at least a portion of said roller ball being exposed through an opening in said housing to allow said roller ball to contact a surface on which said computer-pointing device rests, movement of said computer-pointing device across said surface imparting rotation of said roller ball;
   a sensing mechanism sensing movement of said roller ball and generating x-y movement signals corresponding to movement of said computer-pointing device across said surface for conveyance to a host computer; and
   a power generating mechanism independent of said sensing mechanism and in direct contact with said roller ball, said power generating mechanism converting rotational movement of said roller ball into electrical energy that is used to power said computer-pointing device, said power generating mechanism including a roller assembly rotatably coupled to and biased into direct contact with said roller ball and a power generator coupled to the roller assembly.

2. A computer-pointing device according to claim 1 wherein said power generator has a shaft coupled to a roller of said roller assembly, rotation of said roller ball imparting rotation of said roller and in turn said shaft, said power generator outputting electrical pulses in response to rotation of said shaft.

3. A computer-pointing device according to claim 2 wherein said electrical pulses are received by internal circuitry within said housing.

4. A computer-pointing device according to claim 3 wherein said internal circuitry accumulates said electrical pulses to establish an operating voltage that is used to power said internal circuitry and said sensing mechanism.

5. A computer-pointing device according to claim 4 wherein said internal circuitry includes a charge store to accumulate said electrical pulses and establish said operating voltage.

6. A computer-pointing device according to claim 5 wherein said charge store is a capacitor bank.

7. A computer-pointing device according to claim 4 further comprising a rechargeable power supply within said housing to power said internal circuitry and said sensing mechanism, said operating voltage being applied to said rechargeable power supply to recharge the same.

8. A computer-pointing device according to claim 1 wherein said computer-pointing device is cord-based and wherein the electrical energy generated by said power generating mechanism is used to provide power to enable enhanced features of said computer-pointing device.

9. A self-powered computer-pointing device comprising:
   a housing;
   a roller ball accommodated within said housing, at least a portion of said roller ball being exposed through an opening in said housing to allow said roller ball to contact a surface on which said computer-pointing device rests, movement of said computer-pointing device across said surface imparting rotation of said roller ball;

a sensing mechanism including a pair of rollers coupled to said roller ball to sense lateral and axial movement of said computer-pointing device, said sensing mechanism generating x-y movement signals corresponding to movement of said computer-pointing device across said surface for conveyance to a host computer; and a power generating mechanism converting rotational movement of said roller ball into electrical energy that is used to power said computer-pointing device, said power generating mechanism including a transmission coupled to at least one of said rollers and a power generator having a shaft coupled to said transmission, rotation of said roller ball imparting rotation of said at least one roller and thereby imparting rotation of said shaft via said transmission, said power generator outputting electrical pulses in response to rotation of said shaft.

10. A computer-pointing device according to claim 9 wherein said power generating mechanism includes a transmission coupled to each of said rollers and a power generator coupled to each transmission.

11. A computer-pointing device according to claim 9 wherein said electrical pulses are received by internal circuitry within said housing.

12. A computer-pointing device according to claim 11 wherein said internal circuitry accumulates said electrical pulses to establish an operating voltage that is used to power said internal circuitry and said sensing mechanism.

13. A computer-pointing device according to claim 12 wherein said internal circuitry includes a charge store to accumulate said electrical pulses and establish said operating voltage.

14. A computer-pointing device according to claim 13 wherein said charge store is a capacitor bank.

15. A computer-pointing device according to claim 12 further comprising a rechargeable power supply within said housing to power said internal circuitry and said sensing mechanism, said operating voltage being applied to said rechargeable power supply to recharge the same.

* * * * *